United States Patent
Usami et al.

(10) Patent No.: US 8,979,171 B2
(45) Date of Patent: Mar. 17, 2015

(54) VEHICULAR DOOR TRIM

(71) Applicant: Toyota Boshoku Kabushiki Kaisha, Aichi-ken (JP)

(72) Inventors: Katsuhiko Usami, Aichi-ken (JP); Takuma Hiruta, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 14/046,321

(22) Filed: Oct. 4, 2013

(65) Prior Publication Data

US 2014/0132030 A1  May 15, 2014

(30) Foreign Application Priority Data

Nov. 14, 2012 (JP) ................. 2012-250262

(51) Int. Cl.
*B60J 9/00* (2006.01)
*B60N 2/46* (2006.01)
*B60R 13/02* (2006.01)

(52) U.S. Cl.
CPC .............. *B60N 2/466* (2013.01); *B60N 2/4693* (2013.01); *B60R 13/0243* (2013.01); *B60R 2013/0287* (2013.01)
USPC ......................................................... 296/153

(58) Field of Classification Search
CPC ........... B01D 35/02; F16L 41/10; H02G 3/06; H05B 3/06; Y10S 285/903; A47C 1/03; B29C 2791/001; B29C 2793/00; B29C 2793/0036; B29C 2793/009
USPC ............................. 296/153, 146.7; 297/188.14
See application file for complete search history.

(56) References Cited

U.S. PATENT DOCUMENTS

| 5,181,759 | A | * | 1/1993 | Doolittle ..................... 296/153 |
| 5,584,144 | A | * | 12/1996 | Hisano ........................ 49/502 |
| 6,837,544 | B2 | * | 1/2005 | Bornchen et al. ........ 297/411.21 |
| 7,192,074 | B2 | * | 3/2007 | DePue et al. ............... 296/37.9 |
| 7,244,383 | B2 | * | 7/2007 | Youngs et al. ............. 264/255 |
| 7,371,341 | B2 | * | 5/2008 | Youngs et al. ............. 264/238 |
| 7,549,689 | B2 | * | 6/2009 | Pinkerton et al. .......... 296/1.02 |
| 8,152,218 | B2 | * | 4/2012 | Hall et al. ................ 296/146.6 |
| 8,863,367 | B2 | * | 10/2014 | Langenbacher et al. ....... 29/428 |
| 2006/0062006 | A1 | * | 3/2006 | Radu et al. .................. 362/488 |
| 2006/0222841 | A1 | * | 10/2006 | Masumizu et al. ........ 428/319.3 |
| 2007/0108830 | A1 | * | 5/2007 | Hessler et al. ........... 297/411.21 |
| 2007/0138833 | A1 | * | 6/2007 | Cowelchuk et al. ..... 296/187.05 |

(Continued)

FOREIGN PATENT DOCUMENTS

JP    2004-175314    6/2004

*Primary Examiner* — Kiran B Patel
(74) *Attorney, Agent, or Firm* — Greenblum & Bernstein, P.L.C.

(57) ABSTRACT

A vehicular door trim includes a trim body having a mounting portion, an armrest projecting toward a compartment inner side and including an upper wall portion having a mounting hole therethrough, the armrest including a fitting recess at an opening edge of the mounting hole, a mounting member fitted to the mounting hole and including a fitting projection on its one end portion and including a fitting portion on its another end portion, the fitting projection fitted to the fitting recess and the fitting portion fitted to the mounting portion, and an armrest surface skin covering at least an upper surface of the upper wall portion and includes an surface skin extended portion covering the opening edge of the mounting hole and a part of the fitting recess, and the part of the fitting recess and the fitting projection hold a part of the surface skin extended portion.

9 Claims, 6 Drawing Sheets

(56) References Cited

U.S. PATENT DOCUMENTS

2012/0257402 A1* 10/2012 Hayashi et al. ............... 362/516
2013/0094233 A1* 4/2013 Ukai et al. .................... 362/511
2013/0155708 A1* 6/2013 Moberg et al. ................ 362/488
2013/0235604 A1* 9/2013 Ukai et al. .................... 362/511
2013/0242581 A1* 9/2013 Ukai et al. .................... 362/459
2014/0138978 A1* 5/2014 Langenbacher et al. ... 296/37.13
2014/0152049 A1* 6/2014 Tanizawa .................... 296/146.6
2014/0215769 A1* 8/2014 Lee et al. ........................ 24/289

* cited by examiner

VEHICULAR DOOR TRIM

CROSS REFERENCE TO RELATED APPLICATION

This application claims priority from Japanese Patent Application No. 2012-250262 filed on Nov. 14, 2012. The entire contents of the priority application are incorporated herein by reference.

FIELD OF THE INVENTION

The present disclosure relates to a vehicular door trim on which an armrest is mounted.

BACKGROUND OF THE INVENTION

In a vehicular door trim on which an armrest is mounted, mounting members such as a power window switch finisher or a pull handle are mounted on an upper wall portion of the armrest.

The mounting member is fitted to amounting hole formed in the armrest. A fitting configuration of the mounting member and the mounting hole includes following two types of fitting configurations. In one type of the fitting configurations, the mounting member is fitted to the fitting hole formed in the door trim or the armrest from a front-surface side of the armrest (from an upper side). In another type of the fitting configurations, the mounting member is fitted to the fitting hole of the door trim or the armrest from a rear-surface side of the armrest (from a lower side). The mounting member and the mounting hole are fitted to each other with one of the two types of the fitting configurations. Namely, in mounting the mounting member on the upper wall portion of the armrest, the mounting member is fitted to the mounting hole from an upper side of the mounting hole (a front-surface side of the armrest) or from a lower side of the mounting hole (a rear-surface side of the armrest).

SUMMARY OF THE INVENTION

In fitting the mounting member to the fitting hole from the upper side (the front-surface side) of the armrest, a mount portion is necessarily formed on a front-surface side of a hole edge portion of the mounting hole such that the mounting member is mounted to the mount portion. However, the front-surface side on which the mount portion is formed is a design surface side, and this increases restrictions required for design in a view point of design and aesthetic appearance. For example, a shape or a position of the mount portion is necessarily considered in designing so as not to deteriorate the design or the aesthetic appearance.

In fitting the mounting member to the fitting hole from the lower side (the rear-surface side) of the armrest, a mount portion in which the mounting member is mounted is simply formed on a rear-surface side of the door trim. The rear-surface side of the door trim is not a design-surface side, and the design is not required to be considered. Therefore, a shape or an arrangement position of the mount portion is determined relatively freely, and accordingly, the mount portion is freely designed. Therefore, the mounting member may be fitted to the mounting hole from the lower side effectively.

A surface skin may be provided to cover an upper surface of the armrest. An opening hole is formed in a portion of the surface skin corresponding to the mounting hole such that the surface skin does not cover the mounting hole. An opening end of the opening hole of the surface skin or an end of the surface skin extends through the mounting hole and is located on a lower-surface side of the armrest. Accordingly, the end of the surface skin is not seen from the design-surface side and this enhances aesthetic appearance.

In a process of fitting the mounting member to the mounting hole from the lower side, the mounting member comes in contact with the surface skin extending from the upper side and covering an inner surface of the mounting hole, and the mounting member rubs on the surface skin in the mounting hole from the lower side. As a result, a part of the surface skin fitting through mounting hole and covering the inner surface of the mounting hole may be pushed upward (to the front-surface side) due to rubbing and wrinkles or crinkles may be caused.

The present technology has been made in view of the aforementioned circumstances. An objective of the present technology is to provide a vehicular door trim that is less likely to cause wrinkles or crinkles on a surface skin in fitting a mounting member to a mounting hole of the armrest from a lower side.

According to the present technology, a vehicular door trim includes a trim body having a mounting portion on a compartment outer side surface, an armrest provided at the trim body and projecting from the trim body toward a compartment inner side and including an upper wall portion having a mounting hole therethrough, the armrest including an inner surface having a fitting recess at an opening edge of the mounting hole, a mounting member fitted to the mounting hole and including a fitting projection on its one end portion and including a fitting portion on its another end portion that is opposite from the one end portion, the fitting projection being fitted to the fitting recess and the fitting portion being fitted to the mounting portion of the trim body, and an armrest surface skin covering at least an upper surface of the upper wall portion of the armrest and includes an surface skin extended portion covering the opening edge of the mounting hole and a part of the fitting recess, and a part of the surface skin extended portion covering the part of the fitting recess is held between the part of the fitting recess and the fitting projection.

DETAILED DESCRIPTION OF EMBODIMENTS

Figure 1:
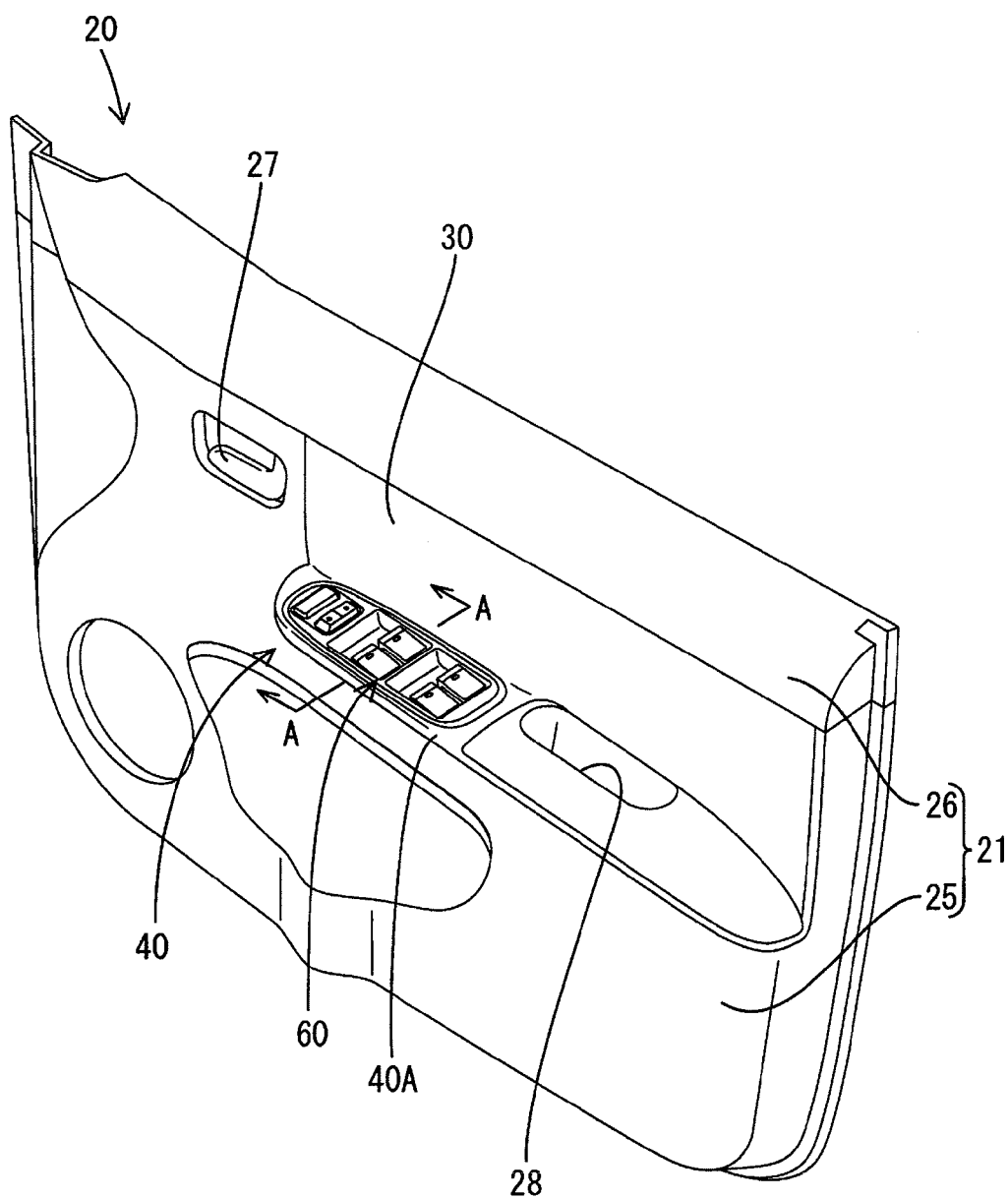
FIG. 1 is a front view illustrating a door trim according to one embodiment of the present technology.

One embodiment will be explained with reference to FIGS. 1 to 6. In FIG. 1 that is a perspective view illustrating a vehicular door trim 20 (a vehicular door trim), a left upper side is a vehicular front side and a right lower side is a vehicular rear side.

The door trim 20 is mounted to a door inner panel (not illustrated) configuring a vehicular door panel from a compartment inner side to configure a vehicular door. As illustrated in FIG. 1, the door trim 20 mainly includes a trim board 21 and an ornament 30. Namely, the trim board 21 and the ornament 30 configure a trim main body of the door trim 20.

The trim board 21 and the ornament 30 are formed of a synthetic resin material such as polypropylene. A material of the trim board 21 and the ornament 30 is not limited to the synthetic resin material but may be a mixture of a wood-based material and synthetic resin.

As illustrated in FIG. 1, the trim board 21 includes two separate components of a lower board 25 configuring a lower portion of the trim board 21 and an upper board 26 configuring an upper portion of the trim board 21.

Figure 4:
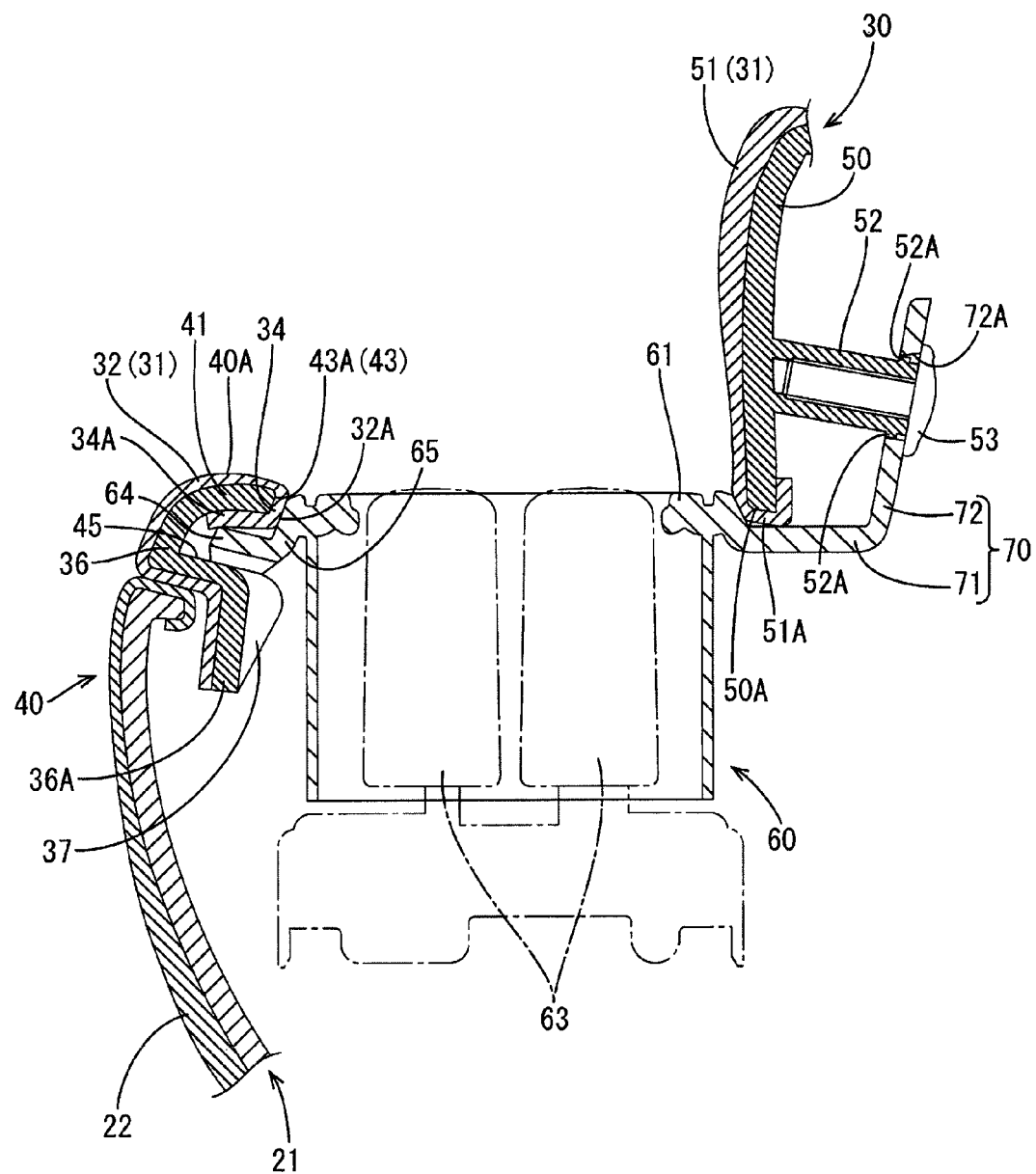
FIG. 4 is a cross-sectional view of the armrest in FIG. 2 taken along an A-A line in FIG. 2.

An inside door handle 27 is mounted in the trim board 27. An armrest 40 is mounted in the door trim 20 so as to project to the compartment inner side. As illustrated in FIG. 4, the armrest 40 is configured by projecting a part of the lower board 25 and a part of the ornament 30 to the compartment inner side. A wall portion (an armrest upper wall portion 41) of the ornament 30 projecting to the compartment inner side configures an upper surface 40A of the armrest 40.

As illustrated in FIG. 4, the ornament 30 has an ornament vertical wall portion 50 (a vertical wall portion) that extends upwardly from a compartment outer side end of the upper surface 40A of the armrest 40.

Figure 2:
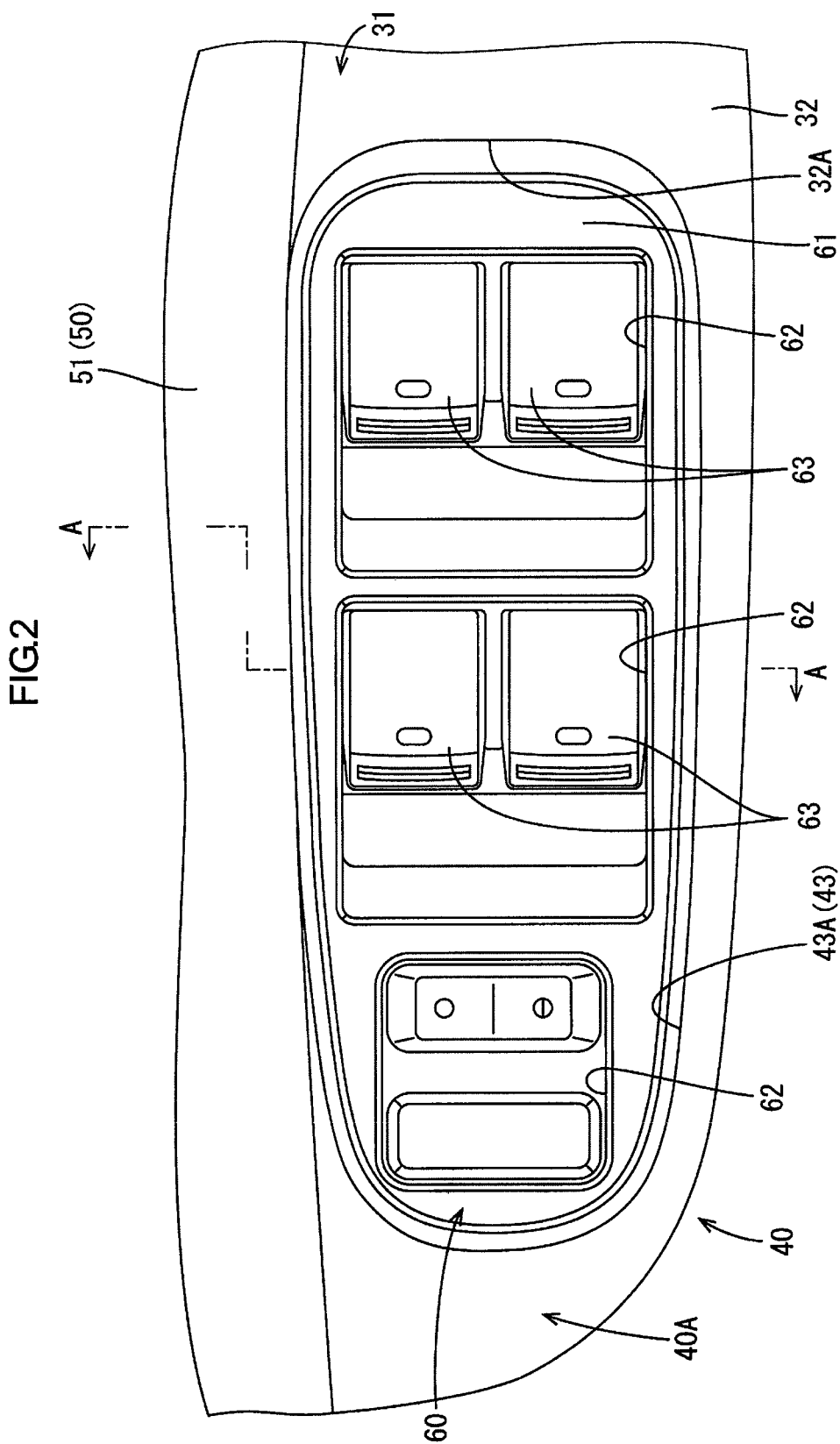
FIG. 2 is a plan view illustrating an armrest included in the door trim in FIG. 1 seen from above.
Figure 3:
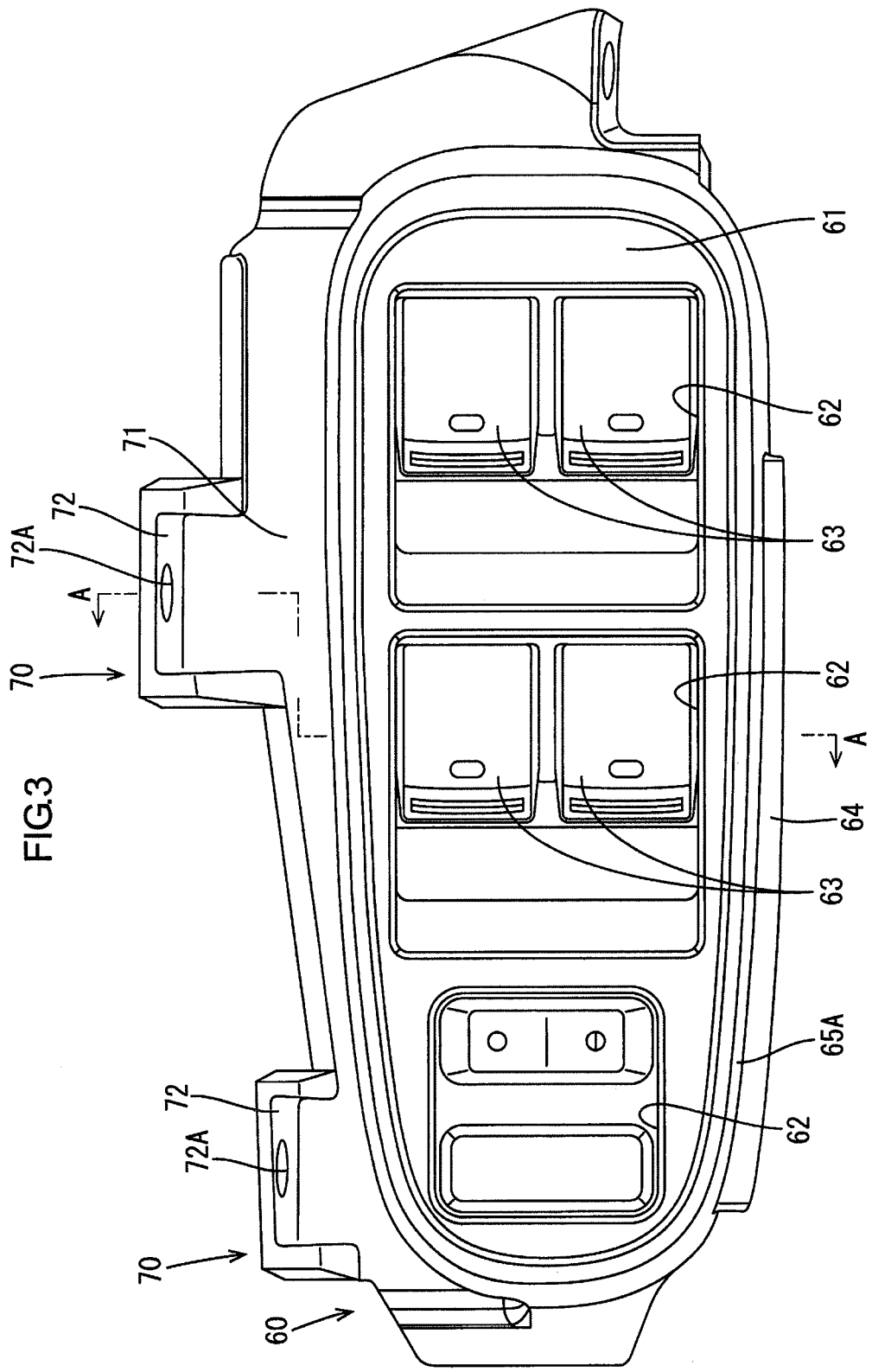
FIG. 3 is a plan view illustrating a switch base mounted in the armrest.

A switch base 60 (a mounting member, a utility part) is mounted in a vehicular front end portion of the upper surface 40A of the armrest 40. As illustrated in FIGS. 2 and 3, the switch base 60 has a base body 61 (a main body of the mounting member) that has a rectangular shape extending in a vehicular front-rear direction (a left-right direction in FIGS. 2 and 3) in a plan view.

The base body 61 has a plurality of switch mount portions 62 that open upwardly. Each of the switch mount portions 62 has a switch operation portion 63 therein. Examples of the switch operation portion 63 are a switch for raising and lowering a window glass (not illustrated) and a window lock switch.

A mounting hole 43 is formed in an armrest upper wall portion 41 so as to penetrate therethrough in an upper-lower direction (in a front-rear direction of the armrest). As illustrated in FIG. 4, the switch base 60 is mounted in the mounting hole 43. The mounting hole 43 has a square shape in a plan view such that the base body 61 is fitted therein (see FIG. 2). The switch base 60 (specifically, the base body 61) is configured to be fitted to the mounting hole 43 from a lower side (a rear-surface side of the armrest).

As illustrated in FIG. 4, an inner surface 43A of the mounting hole 43 that is located on a compartment inner side is recessed and a fitting recess 45 is formed on the inner surface 43A so as to be open toward a compartment outer side. The fitting recess 45 is open downwardly such that a lower surface of the fitting recess 45 is inclined downwardly.

The switch base 60 has a fitting projection 64 provided on an end portion (one end portion) thereof that is on a compartment inner side. The fitting projection 64 is fitted to the fitting recess 45. Specifically, the fitting projection 64 is formed on an upper end portion of an inner compartment side upper end portion of the base body 61. As illustrated in FIG. 3, the fitting projection 64 projects toward a compartment inner side (to a lower side in FIG. 3) and extends in a vehicular front-rear direction or a longitudinal direction of the base body 61.

Figure 5:
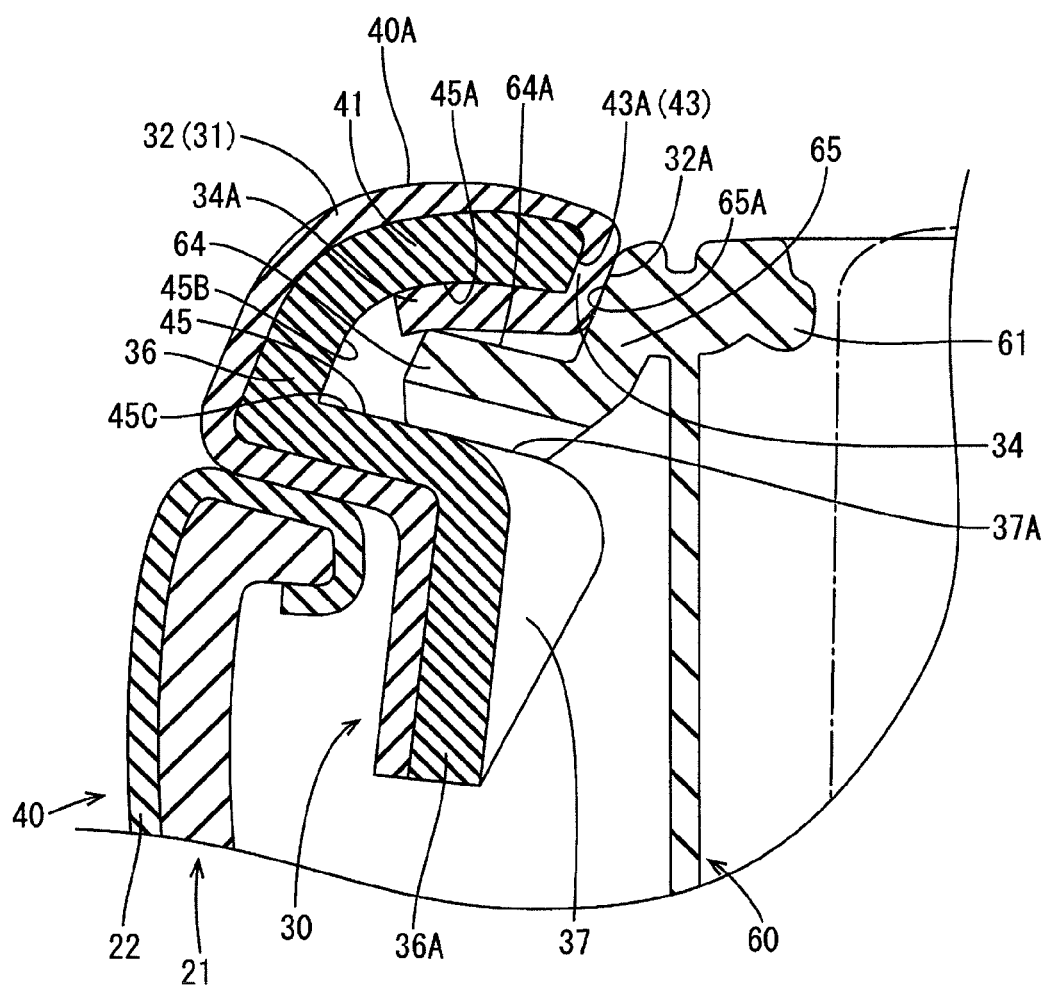
FIG. 5 is an enlarged cross-sectional view illustrating the vicinity of a fitting recess in FIG. 4.

As illustrated in FIG. 4, the ornament 30 has a wall portion 36 on a compartment inner side that configures an opening edge portion of the mounting hole 43. A part of the wall portion 36 is bent toward a compartment inner side to be recessed and configure the fitting recess 45. An extended wall portion 36A extends downwardly from a compartment inner side end of the bent portion of the wall portion 36. The fitting recess 45 has an inner surface including an upper surface 45A, a recessed surface 45B and a lower surface 45C, as illustrated in FIG. 5. The lower surface 45 C is inclined downwardly toward the compartment outer side.

Projection ribs 37 are formed on a compartment outer side surface of the extending wall portion 36A at intervals so as to project toward the compartment outer side. As illustrated in FIG. 5, a projection amount of the projection rib 37 projecting from the compartment outer side surface of the extending wall portion 36A increases as it goes closer to an upper portion. An upper surface 37A of the projection rib 37 is on a same plane as the lower surface 45C of the fitting recess 45. Accordingly, the upper surface 37A of the projection rib 37 supports the fitting projection 64 fitted to the fitting recess 45 from a lower side. Namely, the upper surface 37A of the projection rib 37 configures apart of the fitting recess 45 (an opening end portion). The projection ribs 37 are integrally formed with the wall portion 36. The projection ribs 37 may not provided and the wall portion 36 may be formed such that the lower surface 45C extends to form the upper surface 37A.

As illustrated in FIG. 4, a trim surface skin 22 covers a surface of the trim board 21 and an ornament surface skin 31 covers a surface of the ornament 30. The ornament surface skin 31 includes an armrest cover portion 32 (an armrest surface skin) and a vertical wall cover portion 51 (a vertical wall surface skin). The armrest cover portion 32 covers the upper surface 40A and a compartment inner side surface of the armrest 40. The vertical wall cover portion 51 covers a compartment inner side surface of the ornament vertical wall portion 50.

As illustrated in FIG. 2, the ornament surface skin 31 has a through hole 32A penetrating through the up-down direction (the front-surface and rear-surface direction of the ornament surface skin). The through hole 32A is formed in a position of the ornament surface skin 31 that overlaps the mounting hole 43 in a plan view. As illustrated in FIGS. 4 and 5, an end portion of the ornament surface skin 31 that forms an opening edge of the through hole 32A on the compartment inner side (a surface skin extended portion 34) extends from the upper surface 40A side of the armrest 40 to the inside of the fitting recess 45 through the mounting hole 43. Namely, the end portion of the ornament surface skin 31 is folded at the opening edge of the mounting hole 43 to wrap the opening edge of the mounting hole 43. The surface skin extended portion 34 that is the end portion of the ornament surface skin 31 covers the opening edge of the mounting hole 43 that is the inner surface 43A and the upper surface 45A of the fitting recess 45.

An end portion 34A of the surface skin extended portion 34 is disposed on the inner surface of the fitting recess 45. As illustrated in FIG. 5, the end portion 34A is sandwiched between the upper surface 45A of the fitting recess 45 facing downward and the fitting projection 64. Namely, the upper surface 45A is covered with the end portion 34A.

A connection wall portion 65 extends downwardly from an upper end portion of the base body 61 and the fitting projection 64 is connected to the base body 61 via the connection wall portion 65. As illustrated in FIG. 5, a compartment inner side surface of the connection wall portion 65 is a contact surface 65A (a first contact surface) that is in contact with the surface skin extended portion 34 and the contact surface 65A and the inner surface 43A of the mounting hole 43 hold the surface skin extended portion 34 therebetween. The contact surface 65A is configured to extend upwardly from a compartment outer side end portion of the upper surface 64A of the fitting projection 64. The connection wall portion 65 has a compartment inner side surface that is the contact surface 65A.

As illustrated in FIG. 4, a projection such as a cylindrical mounting boss 52 (a mounting portion to which a fitting portion is fitted) projects from a compartment outer side surface of the ornament vertical wall portion 50 (a rear surface of the trim main body).

Figure 6:
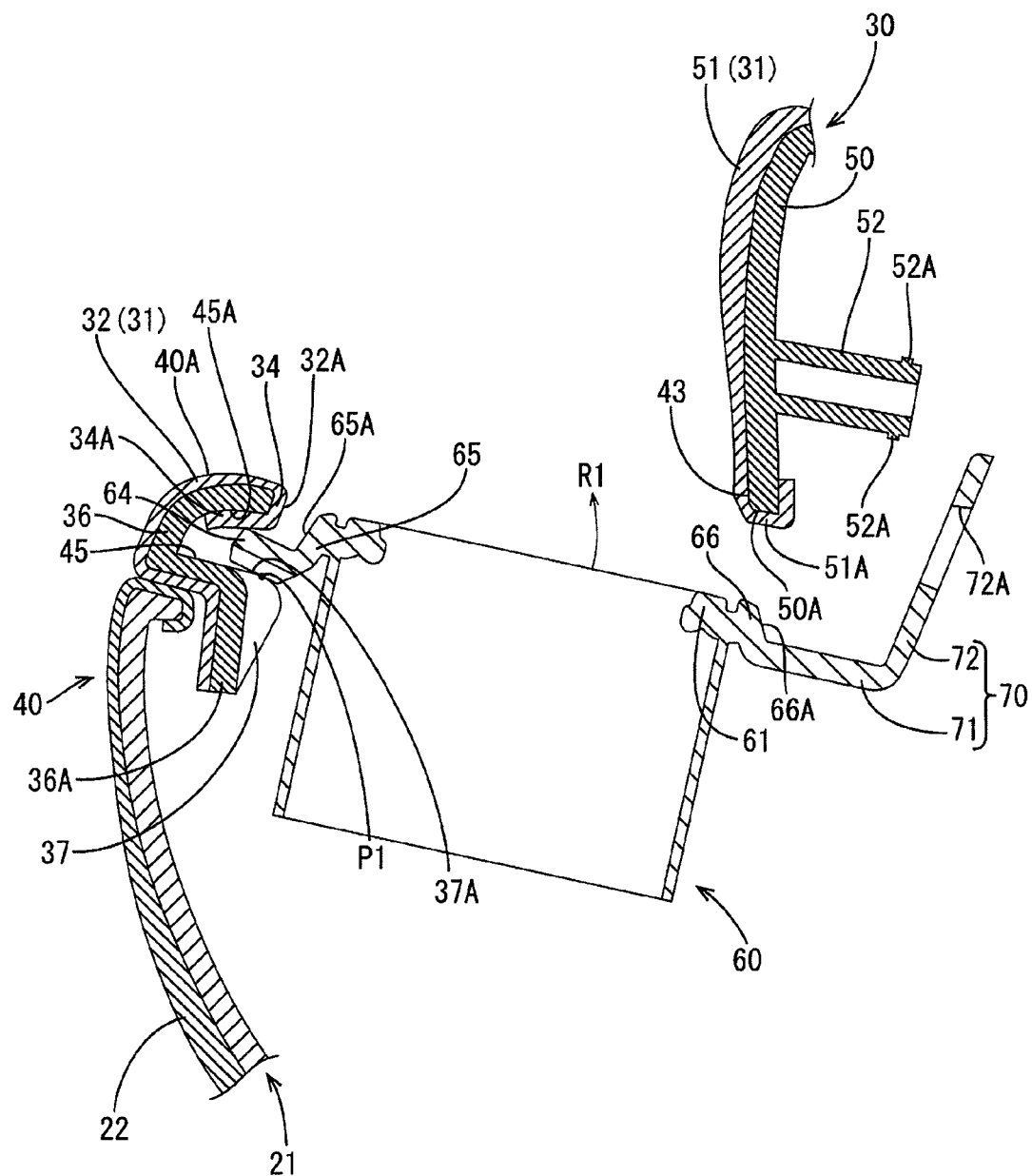
FIG. 6 is a cross-sectional view illustrating a process of assembling the switch base.

As illustrated in FIG. 6, a connection wall portion 66 extends downwardly from an upper end portion of a compartment outer side base body 61 and the connection wall portion 66 has a compartment outer side surface that is a contact surface 66A (a second contact surface). A fitting portion 70 extends toward a compartment outer side from a compartment outer side surface of the base body 61 (another end portion of the base body 61 that is opposite side from the one end portion having the fitting projection 64). The fitting portion 70 extends from a lower end of the connection wall portion 66. The fitting portion 70 includes a basal portion 71 and a distal portion 72. The basal portion 71 is located on a lower side of the ornament vertical wall portion 50. The distal portion 72 extends upwardly from a compartment outer side end of the basal portion 71 so as to be bent from the basal portion 71. The distal portion 72 covers a compartment outer side surface of the ornament vertical wall portion 50. As illustrated in FIG. 3, the switch base 60 includes two basal portions 71 and two distal portions 72.

The distal portion 72 has a boss insertion hole 72A through which a mounting boss 52 is inserted. A distal end portion of the mounting boss 52 is inserted through the boss insertion hole 72A from the compartment inner side, and subsequently, a screw 53 is threaded into the distal end portion of the mounting boss 52. Accordingly, the fitting portion 70 is mounted to the mounting boss 52.

A spacer 52A is formed on an outer peripheral surface of the mounting boss 52 so as to project outwardly. The spacer 52A fills a space between an inner peripheral surface of the boss insertion hole 72A and the outer peripheral surface of the mounting boss 52. For example, a plurality of spacers 52A may arranged at intervals along a circumferential direction of the mounting boss 52. A spacer 52A may extend over an entire periphery of the mounting boss 52.

A lower end portion 51A of the vertical wall cover portion 51 (that configures a part of the through hole 32A opening) extends toward a compartment outer side via the mounting hole 43 and a distal end of the vertical wall cover portion 51 is folded at the lower end portion of the ornament vertical wall portion 50 to cover the compartment outer side surface of the ornament vertical wall portion 50. The basal portion 71 of the fitting portion 70 is arranged at the lower side of the ornament vertical wall portion 50. The basal portion 71 and the lower surface 50A of the ornament vertical wall portion 50 hold the lower end portion 51A of the vertical wall cover portion 51 therebetween. As illustrated in FIG. 4, the compartment inner side lower portion of the vertical wall cover portion 51 is in contact with the contact surface 66A of the connection wall portion 66 and the connection wall portion 66 supports the lower portion of the ornament vertical wall portion 50. The connection wall portion 66 and the lower portion of the ornament vertical wall portion 50 sandwich the lower portion of the vertical wall cover portion 51 therebetween.

Next, steps of mounting the switch base 60 will be explained. As illustrated in FIG. 6, the end portion 34A of the surface skin extended portion 34 is located inside of the fitting recess 45 to cover the inner surface of the fitting recess 45. In such a state, the fitting projection 64 is inserted to the fitting recess 45 from the compartment outer side and the lower side. In the insertion, the end portion 34A of the surface skin extended portion 34 is sandwiched and held between the inner surface of the fitting recess 45 (the surface 45A facing a lower side) and the fitting projection 64. Accordingly, the end portion 34A is fixed by the upper surface 45A and the lower surface 45C of the fitting recess 45 and the upper surface 37A of the projection rib 37 within the fitting recess 45.

While the fitting projection 64 is inserted to the fitting recess 45, the switch base 60 (the base body 61) is rotated upwardly around a contact point of the fitting projection 63 and the fitting recess 45 that is a rotation center P1 (rotation in a counterclockwise direction in FIG. 6). Accordingly, the base body 61 is fitted to the mounting hole 43 from a lower side.

In one embodiment, the fitting projection 64 comes in contact with the upper surface 37A of the projection rib 37 in an initial step of the mounting, and the contact point of the fitting projection 64 and the upper surface 37A is the rotation center P1. In FIG. 6, the rotation direction of the switch base 60 is illustrated by an arrow R1.

The rotation of the switch base 60 in the counterclockwise direction moves the compartment outer side end portion (the fitting portion 70 side end portion) of the switch base 60 upwardly. If the distal portion 72 of the fitting portion 70 comes to a position corresponding to the mounting boss 52, the mounting boss 52 is inserted to the boss insertion hole 72A. Then, the screw 53 is threaded to the distal portion of the mounting boss 52 and the mounting of the switch base 60 is completed.

In the process of the rotation of the switch base 60 in the counterclockwise direction around the point P1 (the process of fitting of the mounting member and the mounting hole), the contact surface 65A of the switch base 60 rotates and moves to be closer to the surface skin extended portion 34. In a state in which the base body 61 is fitted to the mounting hole 43, the contact surface 65A and the inner surface 43A of the mounting hole 43 hold the surface skin extended portion 34 therebetween, as illustrated in FIG. 5.

Next, effects of the embodiment will be explained. In the embodiment, the surface skin extended portion 34 is held between the fitting projection 64 and the fitting recess 45. With such a configuration, in mounting he switch base 60 to the mounting hole 43, the surface skin extended portion 34 is fixed. Accordingly, the surface skin extended portion 34 is less likely to move upwardly.

The switch base 60 is mounted to the mounting hole 43 from a lower side (a rear-surface side of the door trim 20) and also wrinkles or crinkles are less likely to be caused on the armrest cover portion 32 in the vicinity of the opening edge of the mounting hole 43. The fitting projection 64 is fitted to the fitting recess 45 and this fixes one end (the compartment inner side end portion) of the switch base 60. This achieves a simple mounting structure.

As is in the embodiment in which the switch base 60 is mounted from a lower side, only the base body 61 of the switch base 60 can be exposed from the mounting hole 43 as illustrated in FIG. 2. This enhances design.

The contact surface 65A is formed on an upper side of the fitting projection 64 on the one end (the compartment inner side end portion) of the switch base 60. The contact surface 65A and the inner surface 43A of the mounting hole 43 hold the surface skin extended portion 34 therebetween.

The fitting projection 64 and the inner surface of the fitting recess 45 hold the distal end portion of the surface skin extended portion 34 therebetween, and also the inner surface 43A of the mounting hole 43 and the contact surface 65A hold the surface skin extended portion 34 therebetween. Accordingly, the surface skin extended portion 34 is surely held.

The switch base 60 (the base body 61) is rotated upwardly around the contact point of the fitting projection 64 and the fitting recess 45 that is the rotation center P1. With this configuration, the switch base 60 is mounted to the mounting hole 43 from a lower side, and the contact surface 65A is rotated around the contact point and moves to be closer to the surface skin extended portion 34 during the process of fitting the base body 61 to the mounting hole 43.

During the process of fitting the base body 61 to the mounting hole 43, the contact surface 65A is rotated and moves to be closer to the surface skin extended portion 34. Accordingly, during the process of fitting the base body 61 to the mounting hole 43, the contact surface 65A is less likely to rub the surface skin extended portion 34 and the surface skin extended portion 34 is less likely to move upwardly due to the rubbing and friction. Namely, in the process of fitting the base body 61 to the mounting hole 43 from a lower side, the surface skin extended portion 34 is less likely to receive upward force to move out of the mounting hole 43.

The fitting recess 45 is open downwardly to be tilted downwardly with respect to a horizontal surface.

With such a configuration, the fitting projection 64 is fitted to the fitting recess 45 obliquely from a right lower side. Therefore, in fitting the switch base 60 (the base body 61) to the mounting hole 43 from a lower side, the fitting projection 64 is easily fitted to the fitting recess 45.

Specifically, as illustrated in FIG. 6, the switch base 60 is mounted from the compartment outer side and obliquely from a right lower side not to be in contact with the ornament vertical wall portion 50. Therefore, the fitting projection 64 is also fitted to the fitting recess 45 obliquely from the right lower side. According to the embodiment, the fitting projection 64 is easily fitted to the fitting recess 45 obliquely from the right lower side.

The fitting projection 64 is formed on the compartment inner side end portion of the switch base 60. The fitting portion is the fitting portion 70 that extends from the compartment outer end portion of the switch base 60 toward the compartment outer side. The ornament 30 includes the ornament vertical wall portion 50 extending upwardly from the compartment outer side end portion of the upper surface of the armrest 40. The fitting portion 70 includes the basal portion 71 and the distal portion 72. The basal portion 71 is arranged on the lower side of the ornament vertical wall portion 50. The distal portion 72 is bent and extends from the compartment outer side end portion of the basal portion 71 to cover the compartment outer side surface of the ornament vertical wall portion 50. The distal portion 72 is mounted to the mounting boss 52. The basal portion of the fitting portion 70 and the lower surface 50A of the ornament vertical wall portion 50 hold the lower end portion 51A of the vertical wall cover portion 51 therebetween. The lower end portion 51A of the vertical wall cover portion 51 covers at least the compartment inner side surface of the ornament vertical wall portion 50.

With this configuration, the lower end portion 51A of the vertical wall cover portion 51 is held and wrinkles or crinkles are less likely to be caused on the vertical wall cover portion 51.

The mounting portion is the mounting boss 52 extending from the rear-side surface of the ornament 30. The fitting portion 70 has the boss insertion hole 72A through which the mounting boss 52 is inserted. The spacer 52A is or the spacers 52A are formed on the outer peripheral surface of the mounting boss 52 so as to project therefrom to fill the space between the inner peripheral surface of the boss insertion hole 72A and the outer peripheral surface of the mounting boss 52.

With the spacer 52A or the spacers 52A, in a state that the mounting boss 52 is inserted to the boss insertion hole 72A, a space is not generated between the outer peripheral surface of the mounting boss 52 and the inner surface of the boss insertion hole 72A. Any rattling is less likely to be caused between the mounting boss 52 and the fitting portion 70. With this configuration, in the mounting of the switch base 60, the mounting boss 52 is inserted to the boss insertion hole 72A. Therefore, the fitting portion 70 is fixed (temporally or provisionally fixed) without rattling and this improves workability of the mounting.

Specifically, for example, if the screw 53 is threaded in the distal end portion of the mounting boss 52, the switch base 60 is provisionally fixed, and therefore, the screw 53 is easily mounted to the mounting boss 52. With the provisional fixing of the mounting boss 52 and the screw 53, the ornament 30 and the switch base 60 are carried as one integral member even before the screw 53 is threaded to the distal end portion of the mounting boss 52.

Other Embodiments

The present technology is not limited to the description as described above with reference to the drawings. For example, the present technology may include following embodiments.

(1) In the above embodiment, the switch base 60 is one of examples of the mounting member that is mounted to the armrest 40. However, it is not limited thereto. Any member can be used as the mounting member as long as it can be mounted to the mounting hole formed in the armrest. For example, a pull handle box 28 (see FIG. 1) configuring a pull handle may be an examples of the mounting member.

(2) In the above embodiment, the armrest 40 is configured with the lower board 25 and the ornament 30. However, it is not limited thereto. The armrest 40 may be configured with only the lower board 25. The armrest 40 may be configured with any other member than the lower board 25 and the ornament 30.

(3) In the above embodiment, the fitting recess 45 is formed on the compartment inner side surface of the inner surface of the mounting hole 43. However, it is not limited thereto. For example, the fitting recess 45 may be formed on a vehicular front side surface of the inner surface of the mounting hole 43. If the fitting recess 45 is formed on the vehicular front side surface of the inner surface of the mounting hole 43, the fitting projection 64 is formed on a vehicular front end portion of the switch base 60. In such a case, the switch base 60 may be rotated upwardly around the vehicular front end portion of the switch base 60 such that the switch base 60 is mounted to the mounting hole 43.

(4) In the above embodiment, the fitting portion 70 is arranged on the compartment outer side end portion of the switch base 60. However, it is not limited thereto. The fitting portion 70 may be provided in any portion of the switch base 60 as long as it is provided on an end portion that is opposite to the end portion in which the fitting projection 64 is provided. For example, if the fitting projection 64 is provided on the vehicular front end portion of the switch base 60, the fitting portion 70 may be provided on a vehicular rear end portion of the switch base 60.

(5) In the above embodiment, the armrest cover portion 32 (the armrest surface skin) and the vertical wall cover portion 51 (the vertical wall surface skin) configure one surface skin (the ornament surface skin 31). However, it is not limited thereto. For example, each of the armrest cover portion 32 and the vertical wall cover portion 51 is configured with a separate member.

(6) In the above embodiment, the fitting portion 70 is mounted to the mounting boss 52 with using the screw 53.

However, it is not limited thereto. For example, the distal end of the mounting boss 52 may be thermally clamped to mount the fitting portion 70 to the mounting boss 52.

(7) In the above embodiment, the mounting boss 52 is one of examples of the mounting portion and the fitting portion 70 is one of examples of the fitting portion. However, it is not limited thereto. The mounting portion and the fitting portion may have any configurations as long as they can be fitted to each other and the configurations thereof may be altered if necessary. For example, the mounting portion may be a mounting stopper and the mounting stopper may be stopped by the fitting portion.

What is claimed is:

1. A vehicular door trim comprising:
   a trim main body having a mounting portion provided on a compartment outer side surface at a compartment outer side of the door trim;
   an armrest provided at the trim main body and projecting from the trim main body in a direction toward a compartment inner side of the door trim and including an upper wall portion having a mounting hole therethrough, the armrest including an inner surface having a fitting recess at an opening edge of the mounting hole;
   a mounting member fitted to the mounting hole and including a fitting projection on its one end portion thereof and including a fitting portion on another end portion thereof that is opposite from the one end portion, the fitting projection being fitted to the fitting recess and the fitting portion being fitted to the mounting portion of the trim main body; and
   an armrest surface skin covering at least an upper surface of the upper wall portion of the armrest and includes a surface skin extended portion covering the opening edge of the mounting hole and a part of the fitting recess, and a part of the surface skin extended portion covering the part of the fitting recess is held between the part of the fitting recess and the fitting projection.

2. The vehicular door trim according to claim 1, wherein the mounting member further includes a contact surface on an upper side of the fitting projection, the contact surface and an inner surface of the opening edge of the mounting hole hold the surface skin extended portion therebetween.

3. The vehicular door trim according to claim 2, wherein the mounting member is configured to be rotated around a contact portion of the fitting projection and the fitting recess so as to move upwardly and to be fitted to the mounting hole from a lower side of the mounting hole, and
   the contact surface of the mounting member is configured to be rotated around the contact point so as to move closer to the surface skin extended portion when the mounting member is fit to the mounting hole.

4. The vehicular door trim according to claim 1, wherein the fitting recess has an opening that is open downwardly with respect to a horizontal plane.

5. The vehicular door trim according to claim 1, wherein the mounting member has the fitting projection on the one end portion thereof that is located on the compartment inner side of the door trim,
   the mounting member has the fitting portion on the other end portion thereof that is located on the compartment outer side of the door trim and extends from the other end portion toward the compartment outer side,
   the trim main body includes a vertical wall portion extending upward from a compartment outer side end portion of the upper surface of the armrest,
   the fitting portion includes a basal portion and a distal portion,
   the basal portion is located below the vertical wall portion and the distal portion extends from a compartment outer side end of the basal portion and is bent upwardly to cover a compartment outer side surface of the vertical wall portion, and
   the distal portion is mounted to the mounting portion, and the vehicular door trim further comprises:
   a vertical wall portion surface skin covering at least a compartment inner side surface of the vertical wall portion, wherein
   the basal portion of the fitting portion and a lower surface of the vertical wall portion hold a lower end portion of the vertical wall portion surface skin therebetween.

6. The vehicular door trim according to claim 1, wherein the mounting portion is a projection projecting from the compartment outer side surface of the trim main body,
   the fitting portion has a projection insertion hole through which the projection is inserted, and
   the projection has a spacer on an outer surface thereof, the spacer being projected from the outer surface and filling a gap between an inner surface of the projection insertion hole and the outer surface of the projection.

7. The vehicular door trim according to claim 5, wherein the vertical wall portion surface skin further covers the lower surface of the vertical wall portion and the compartment inner side surface of the vertical wall portion.

8. The vehicular door trim according to claim 1, wherein the fitting recess is open toward the compartment outer side of the door trim, and
   the fitting recess has an inner surface including an upper surface, a lower surface, and a recessed surface connecting the upper surface and the lower surface,
   the upper surface is covered with the surface skin extended portion, and
   the lower surface is inclined downwardly toward the compartment outer side of the door trim.

9. The vehicular door trim according to claim 5, wherein the fitting projection and the fitting portion respectively include a fitting projection side connection wall portion and a fitting portion side connection wall portion,
   the mounting member includes the fitting projection via the fitting projection side connection wall portion and includes the fitting portion via the fitting portion side the connection wall portion,
   the fitting projection side connection wall portion of the fitting projection has a first contact surface, and
   the first contact surface and an inner surface of the opening edge of the mounting hole hold the surface skin extended portion therebetween, and
   the fitting portion side connection wall portion of the fitting portion has a second contact surface, and
   the second contact surface and an a lower portion of the vertical wall portion hold the lower end portion of the vertical wall portion surface skin therebetween.

* * * * *